(12) United States Patent
Menke et al.

(10) Patent No.: US 7,377,380 B2
(45) Date of Patent: May 27, 2008

(54) MODULAR CONVEYOR MAT

(75) Inventors: Cornelis Hendrik Myndert Menke, Delft (NL); Gijsbertus Johannes Verduijn, Terheijden (NL)

(73) Assignee: Rexnord FlatTop Europe B.V., Gravenzande (NL)

( * ) Notice: Subject to any disclaimer, the term of this patent is extended or adjusted under 35 U.S.C. 154(b) by 0 days.

(21) Appl. No.: 10/572,773

(22) PCT Filed: Sep. 23, 2004

(86) PCT No.: PCT/NL2004/000659

§ 371 (c)(1),
(2), (4) Date: Nov. 10, 2006

(87) PCT Pub. No.: WO2005/028341

PCT Pub. Date: Mar. 31, 2005

(65) Prior Publication Data

US 2007/0119692 A1    May 31, 2007

(30) Foreign Application Priority Data

Sep. 23, 2003  (NL) .................................. 1024361

(51) Int. Cl.
*B65G 17/08*  (2006.01)
(52) U.S. Cl. ...................... 198/851; 198/850; 198/852; 198/853
(58) Field of Classification Search ............... 198/850, 198/851, 852, 853
See application file for complete search history.

(56) References Cited

U.S. PATENT DOCUMENTS 5,174,439 A * 12/1992 Spangler et al. ............ 198/853
5,181,601 A *  1/1993 Palmaer et al. ............. 198/831

(Continued)

FOREIGN PATENT DOCUMENTS

EP          0 878 418 A    11/1998

(Continued)

OTHER PUBLICATIONS

International Search Report Issued in Connection with PCT/NL2004/00659, which was filed on Sep. 23, 2004, and claims priority of NL 1024361, which was filed Sep. 23, 2003.

*Primary Examiner*—Douglas A Hess
(74) *Attorney, Agent, or Firm*—Quarles & Brady LLP

(57) ABSTRACT

A conveyor belt (1), comprising a number of plastic modules (3) successive in conveying direction (2) which are each provided at a front and rear side (4, 7) with a row of projections (5, 8) extending transversely to the conveying direction (2), provided with hinge holes with recesses (6, 9) located therebetween, the projections (5, 8) cooperating with recesses (6, 9) of adjoining modules, while hinge loops of successive modules (3) are coupled with the aid of hinge pins, extending through the hinge holes, transversely to the transport direction (2), the hinge pins being included with clearance in oversize hinge holes of projections (5, 8) at the front and/or the rear side (4, 7). At least two successive modules (3) are interconnected via an intermediate element (12) borne on a hinge pin (11A) and bearing mounted so as to be pivotal relative to a pivot (A) substantially transverse to the hinge pin (11A) in a bearing opening formed in one of the modules (3).

22 Claims, 5 Drawing Sheets

U.S. PATENT DOCUMENTS

| | | |
|---|---|---|
| 5,429,227 A * | 7/1995 | Krossmann et al. ........ 198/852 |
| 6,202,834 B1 * | 3/2001 | Layne et al. ................ 198/852 |
| 6,250,459 B1 * | 6/2001 | Coen et al. ................. 198/852 |
| 6,758,328 B2 * | 7/2004 | Arai et al. .................. 198/852 |
| 7,044,290 B2 * | 5/2006 | Garbagnati et al. ......... 198/852 |
| 7,073,662 B2 * | 7/2006 | Neely et al. ................ 198/850 |
| 7,168,557 B2 * | 1/2007 | Mitchell et al. ............ 198/852 |

FOREIGN PATENT DOCUMENTS

EP     1 238 927 A     9/2002

* cited by examiner

MODULAR CONVEYOR MAT

CROSS-REFERENCE TO RELATED APPLICATIONS

This application claims priority to International Patent Application PCT/NL2004/000659, filed 23 Sep. 2004, which claims priority of NL application 1024361 filed 23 Sep. 2003.

The invention relates to a conveyor mat comprising a number of plastic modules successive in a conveying direction, each provided at a front and rear side with a row of projections extending transversely to the conveying direction, provided with hinge holes with recesses located therebetween, the projections cooperating with recesses of successive modules, the hinge loops of adjoining modules being coupled with the aid of hinge pins, reaching through the hinge holes transversely to the transport direction, while hinge pins are included with clearance in oversized hinge holes of projections at the front and/or the rear side.

Such a conveyor mat is generally known and is indicated by the skilled person as modular bend mat or flexmat. As the hinge pins are included with clearance in the hinge holes, the projections can slide into and out of the recesses so that the conveying path to be travelled by the modules of the conveyor mat can make a bend in the conveying plane.

Often, the modules are laid side by side transversely to the conveying direction, so that the width of the mat can be varied in steps. The modules of the mat can be guided along a conveying path. The mat can then negotiate a bend transversely to the conveying plane in that successive modules can pivot about the hinge pins.

When travelling a straight length of the conveying path, the tensile force in the mat is transmitted via the hinge pins over the entire width of the mat from the projections on the edge of one module to the projections on the adjoining edge of the successive module.

A problem that occurs with such modular bend mats is the absorption of the forces during negotiation of the bend.

As the projections and recesses of the modules when a bend is negotiated, slide into each other, it is impossible without further measures to transmit the tensile force in the mat via the hinge pin over the entire width of the mat from the projections on one side of the module to the projections on the adjoining side of a successive module. In theory, in the bend, all force will be transmitted via the outermost projections while the projections in the center and the inside transmit no forces. In practice, the flexibility of the modules and the material of the hinge pins can provide for a number of outer projections to contribute to the transmission of forces but still, when the bend is negotiated, an increased load is formed on the outer edge of the mat. This may lead to the mat giving way, which, in practice, often forms a restriction on the usability of the mat.

It has already been suggested to reinforce the projections on the edges of the conveyor mat, for instance by designing them to be thicker and/or by coupling successive hinge pins on the edge of the conveyor mat with the aid of steel links. A disadvantage of the first solution is, inter alia, that this adversely affects the sliding in and sliding out of the mat and adversely affects the manufacture of the modules as injection moulding product. A disadvantage of the second solution is, inter alia, that, when negotiating a bend, the contact surfaces of the hinge pin and link slide over each other, so that relatively much wear occurs, for instance in that the links dig into the pin.

The object of the invention is a modular bend mat of the type indicated in the opening paragraph, which, while maintaining the advantages, avoids the disadvantages mentioned. To that end, the conveyor mat according to the invention is characterized in that at least two successive modules are interconnected via an intermediate element borne on a hinge pin and which is bearing mounted so as to be pivotal substantially transversely to the hinge pin in a bearing opening formed in one of the modules. By pivoting in its bearing opening upon negotiation of the bend, the intermediate element can ensure a sufficiently large surface for transmission of forces between the pin and the module. The pin can maintain a good contact with the intermediate element which, in turn, through pivotal moment, can maintain a good contact with the module.

Preferably, successive modules interconnected via intermediate elements link up to form a chain extending in conveying direction. The chain then forms a continuous reinforcement for the mat. It is noted that then, it is not necessary that the intermediate elements and the bearing openings be aligned; this is however preferred.

Preferably, the intermediate element has an at least substantially cylindrical or conical casing surface for cooperation with a correspondingly formed surface of the bearing opening.

Preferably, further, the intermediate element is provided with a bore extending transversely to the pivot of the intermediate element for including the hinge pin. Preferably, the bore is then provided with an at least partly cylindrical or conical abutting surface for cooperation with the surface of the hinge pin.

With the intermediate element, separated layers of surfaces can be realized for pivotal movement about an axis in the conveying plane and for pivotal movement about an axis transverse to the conveying plane, so that these pivotal movements are realized separately.

The intermediate element can be designed from a material different from the material of the hinge pin and/or the module, for instance a plastic material with good sliding properties.

The intermediate element can further be provided with a guide cam extending downward at an underside of the module. With the aid of such a guide cam, known per se, during negotiation of a bend in the conveying plane, the mat can cooperate with a guide of the conveying path. What can be achieved by providing the very intermediate element with a guide cam, is that the guide cam contacts the location where, upon negotiation of a bend, the line of force is located in the conveyor mat. Optionally, the guide cam can be provided with idler means for cooperation with the path guide. Preferably, the idler wheel is at least partly conical, but can for instance also be a cylinder placed around an oblique rotation axis.

Preferably, the bearing openings and the intermediate elements are located adjacent a side edge of the mat. What can be achieved in this manner is that the improved transmission of forces takes place at the location where the force to be transmitted during negotiation of the bend is greatest. In this manner, a chain of reinforcements can be formed, extending adjacent the side edge of the conveyor mat in the conveying direction. However, when the chain of the intermediate elements extends in the center of the mat, the conveyor mat can make a bend in the conveying plane both to the left and to the right.

Here, the choice can be made to include several modules in the mat, transversely to the conveying direction, while the bearing openings have been provided in end modules included on a longitudinal edge of the mat or in center modules included in the center of the mat.

Further, substantially U-shaped reinforcement brackets can be provided, for instance metal reinforcement brackets surrounding the bearing opening and whose free ends are provided with holes for cooperation with a hinge pin reaching through the holes. Preferably, the reinforcement bracket and the hinge pin are attached relative to each other so as to be secured against rotation. As a result thereof, a tensile load can be applied to the cooperation between the pin the bracket without the pin and bracket pivoting relative to each other; the force transmitting contact surfaces between pin and bracket are stationary relative to each other. By using the pin and bracket secured against rotation relative to each other, the mat is provided with force transmitting components which are separated from the elements allowing rotation. When pin and bracket are manufactured from metal, digging in can be avoided. Preferably, adjacent the closed end surrounding the bearing opening, the bracket is provided with oversized holes for contactlessly guiding a further hinge pin.

At least a number of the projections can be formed by hinge loops reaching outwards relative to a central carrier, for instance a first row of projections reaching forward relative to a central carrier and a second series of projections reaching backward relative to the central carrier. The projections reaching forward and the projections reaching backwards can then be staggered relative to each other, but can also be in one line. At least a number of the projections can cooperate alternately, like fingers of two entwined hands. However, it is also possible to have at least a number of the projections cooperate according to a different pattern, for instance according to an ABBA pattern. It is also possible to form at least a number of the projections as a part of a central carrier proceeding in a wave-form. Preferably, the outermost central axes of the holes are in one straight line. Further, the central axes of the hinge holes at the front and rear side are preferably parallel.

A hinge loop can be provided with one hinge hole, but can also define two successive hinge holes of the row. Preferably, the modules, in which a bearing opening has been provided, are provided with at least one hinge loop with two holes enclosing the bearing opening. Optionally, the module can be provided with a fixed hinge pin, for instance a hinge pin that is fixed in the hinge holes enclosing the bearing opening. Preferably, the module is then provided on the same side with further hinge holes.

Preferably, the distance between the outermost central axes of the hinge holes of the modules is constant. A part of the central carrier located, during use, more adjacent the center of the mat can then be narrower in conveying direction than a part of the central carrier located more adjacent the edge so that the recesses between the hinge loops are deeper at the first part in conveying direction than at the second part. As a result, at the part of the module located more adjacent the center, more space is present for sliding into each other while at the part located more adjacent the edge, more material is available in the central carrier for absorbing forces. Thus, a greater moment of inertia is formed at the outside of the module, at the location where, when the bend is negotiated, the moment to be transmitted is greatest.

The invention also relates to a module for a modular conveyor mat.

Further advantageous embodiments of the invention are represented in the subclaims.

The invention will presently be further elucidated with reference to an exemplary embodiment represented in a drawing. In the drawing.

The Figures only relate to schematic embodiments of preferred embodiments of the invention and therefore only serve as non-limitative exemplary embodiment. In the Figures, identical or corresponding parts are indicated with the same reference numerals.

Figure 1:
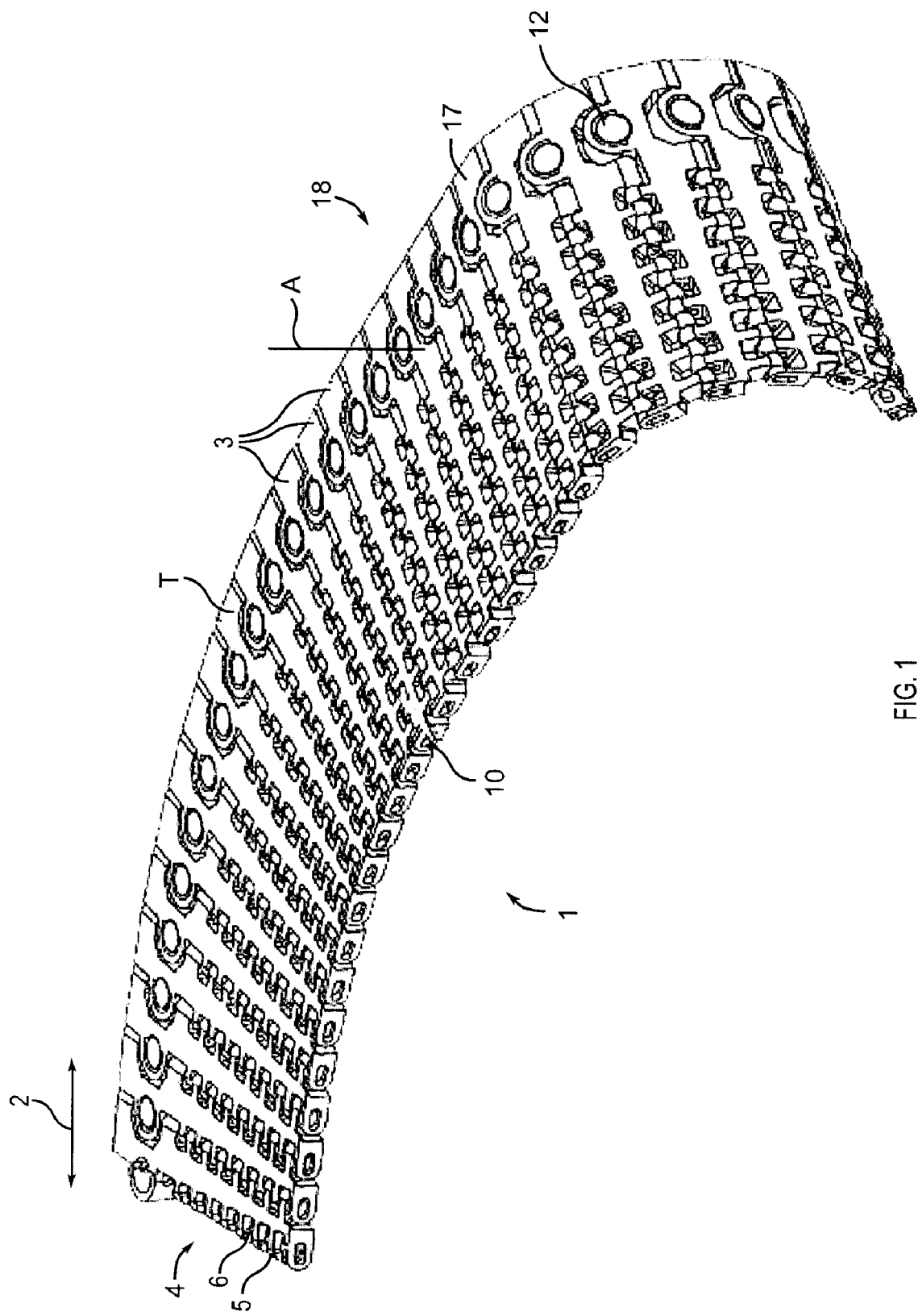
FIG. 1 shows a schematic perspective view of a length of conveyor mat in a first embodiment.
Figure 2:
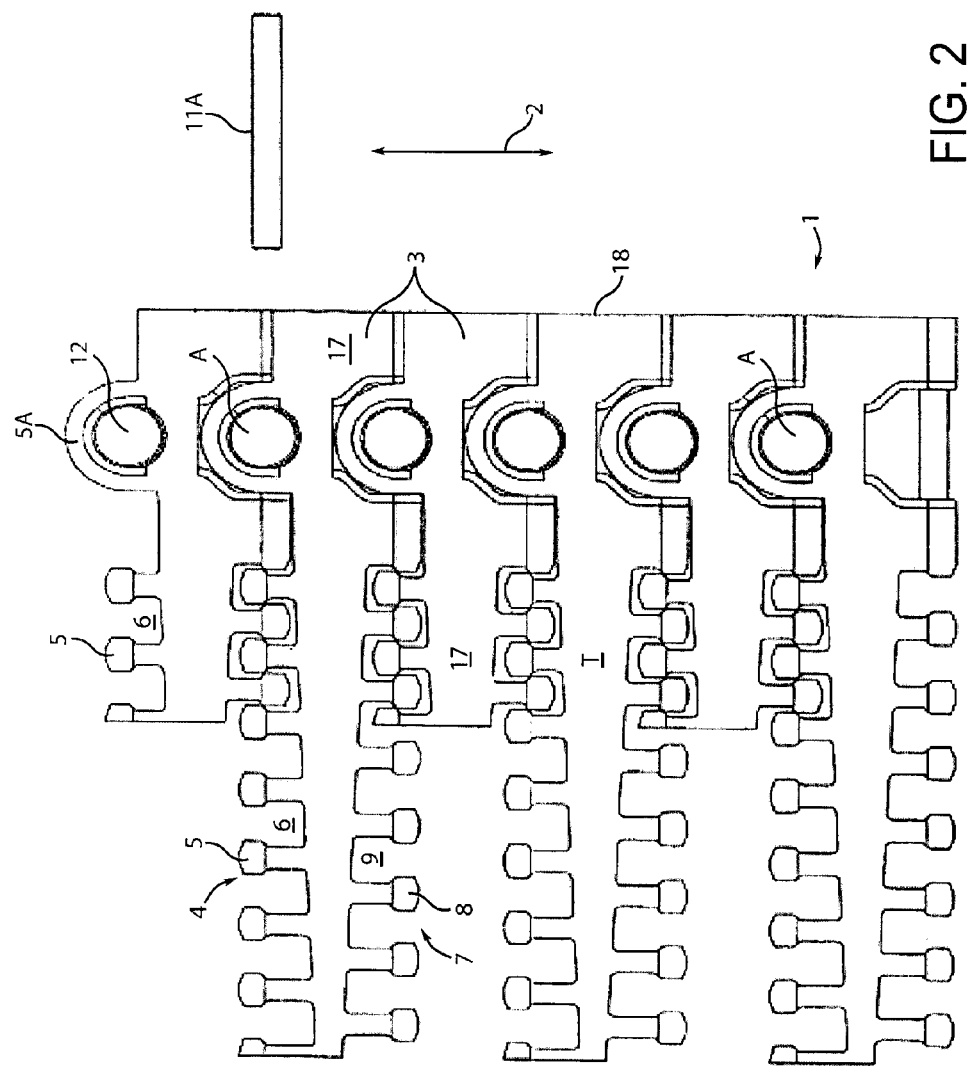
FIG. 2 shows a schematic top plan view of a part of a second embodiment of the conveyor mat.
Figure 3:
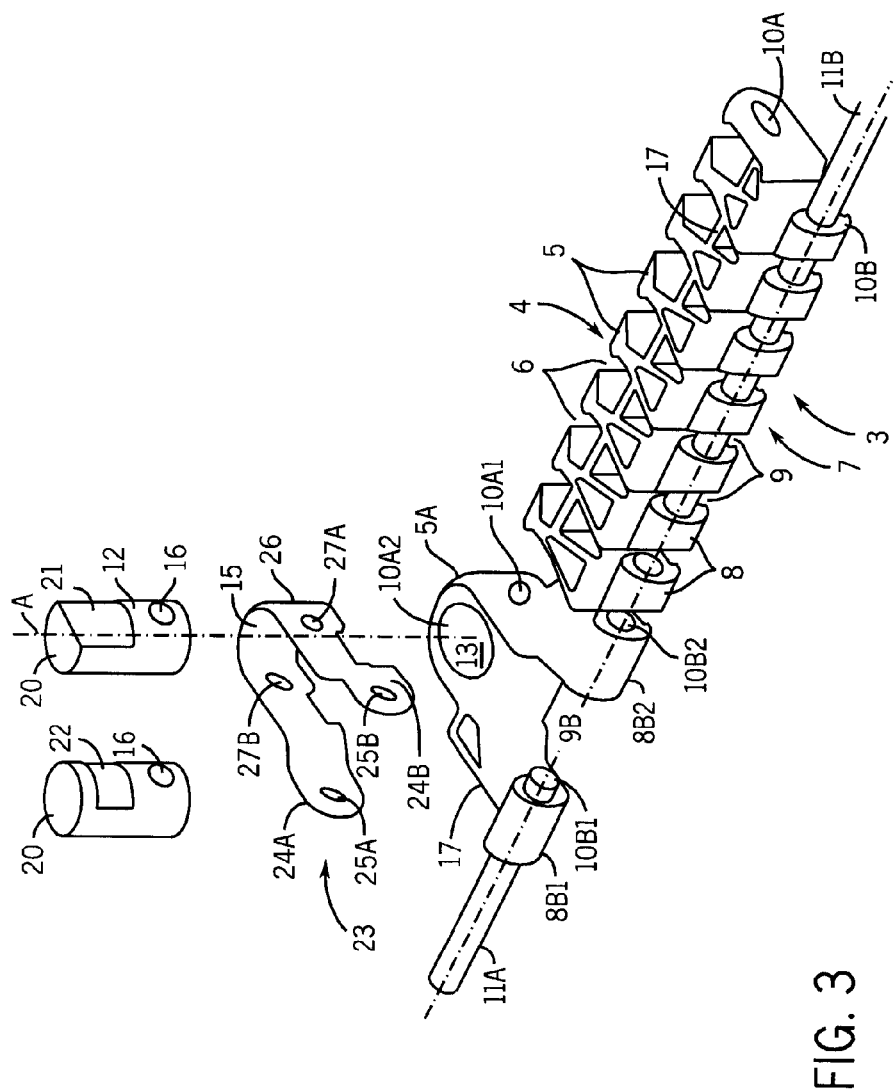
FIG. 3 shows a schematic perspective view of the underside of a module of the conveyor mat of FIG. 1 in taken apart condition.
Figure 4:
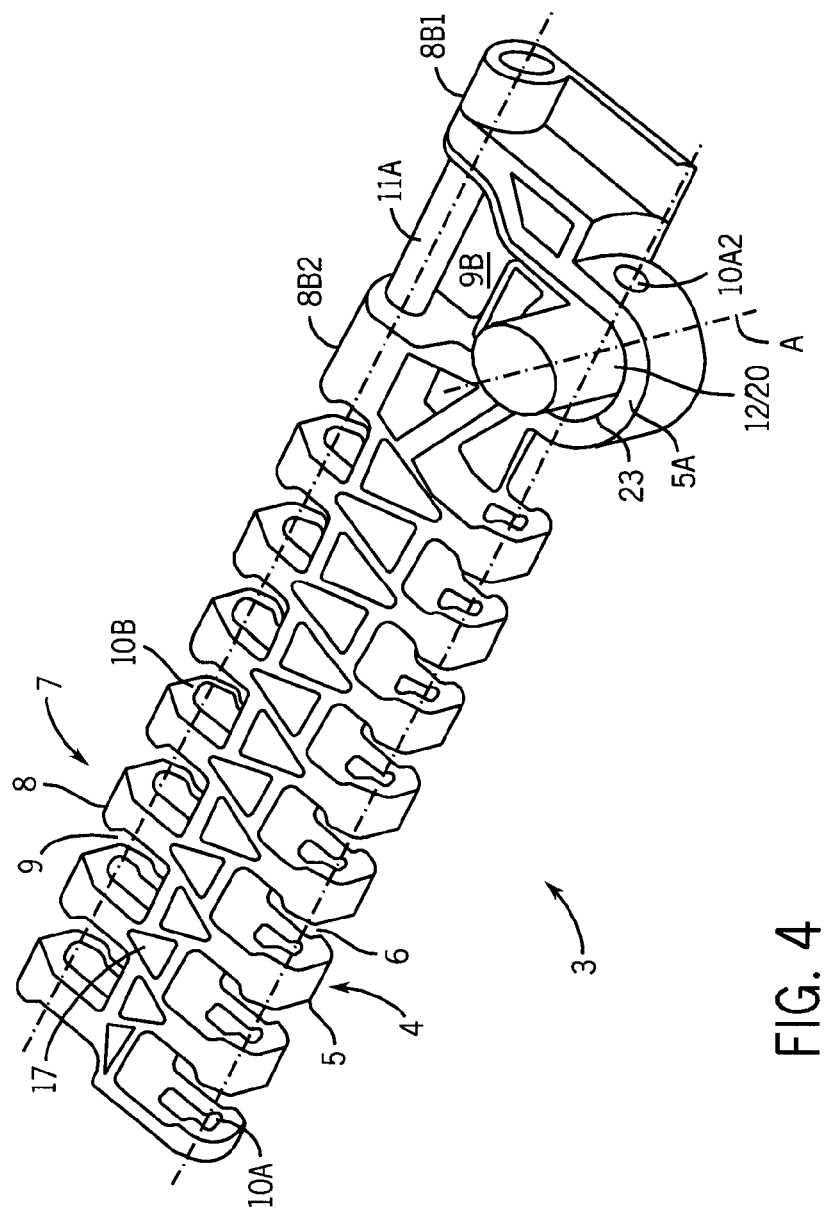
FIG. 4 shows a schematic perspective view of the module of FIG. 3 in composed condition.
Figure 5:
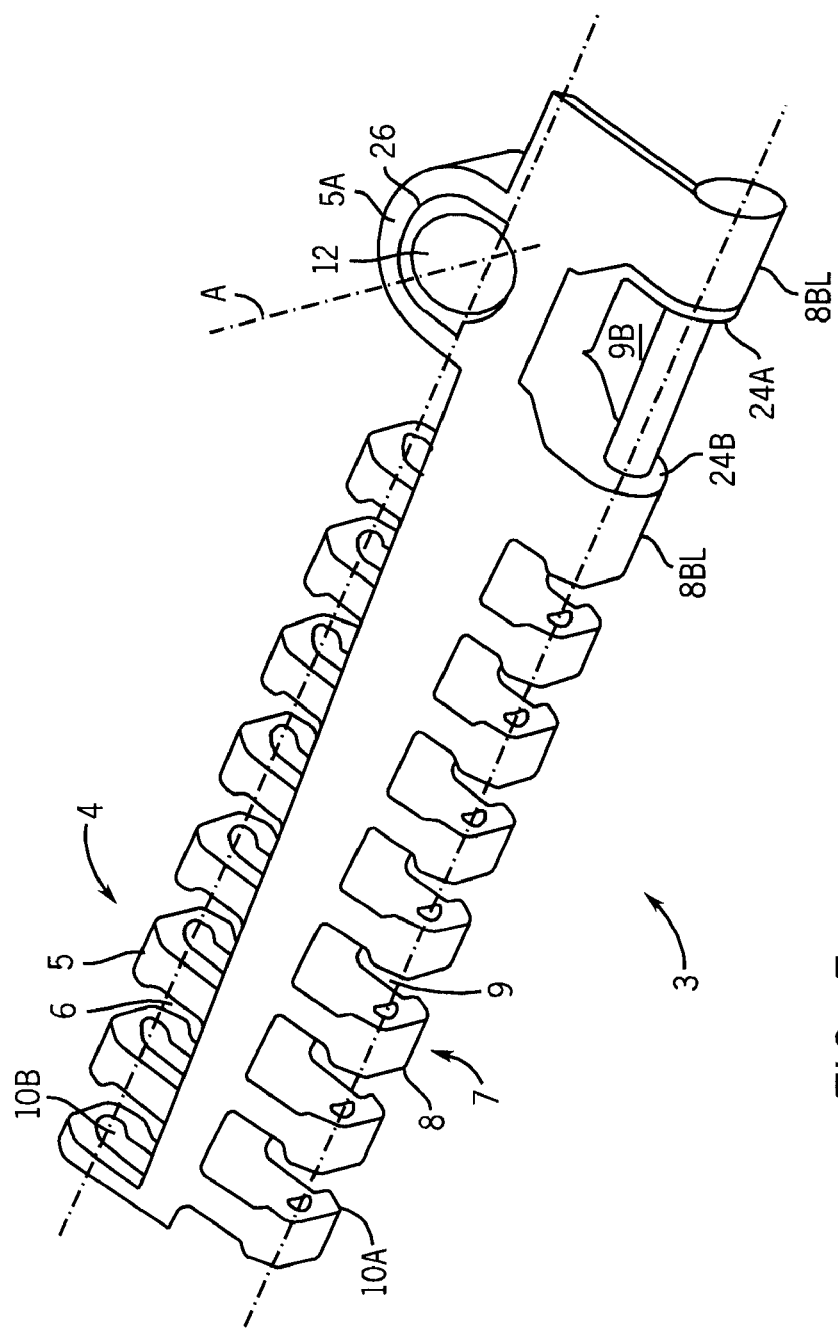
FIG. 5 shows a schematic perspective view of the top side of the module of FIG. 4.

In FIGS. 1 and 2, two exemplary embodiments of modular bend mats according to the invention are represented. Referring to FIG. 1, an assembled conveyor mat 1 is shown, comprising a number of plastic modules 3 successive in a conveying direction indicated with an arrow 2. The plastic modules have been manufactured by means of injection molding and, as can be seen in FIGS. 3-5, are each provided at a front side 4 with a row of forward reaching projections 5 extending transversely to the conveying direction, with recesses 6 located therebetween. Further, at their rear side 7, the modules 3 are provided with a row of backward reaching projections 8 extending transversely to the conveying direction, with recesses 9 located therebetween. As can be seen well in FIG. 1, the projections 5, 8 cooperate with corresponding recesses 6, 9 of successive modules 3. Successive modules 3 are coupled with the aid of hinge pins 11 proceeding transversely to the conveying direction 2. The projections 5, 8 are provided with hinge holes 10, formed by bores extending through the rows of projections, transversely to the conveying direction.

The hinge pins 11 are included with clearance in the hinge holes 10 in the forward reaching projections 5. In this exemplary embodiment, the projections 5 reaching forward are provided with slotted holes 10a as hinge holes, orientated with their longitudinal axis in conveying direction, while the backward reaching projections 8 are provided with cylindrical hinge holes. The outermost central axes through the hinge holes 10a, 10b are in a straight line, extending transversely to the conveying direction. The central axes through hinge holes 10a, 10b run parallel. In this exemplary embodiment, the projections 5, 8 are formed by hinge loops reaching outwards relative to a body part designed as a central carrier 17.

As the hinge pins 11 are included with clearance in the front hinge holes 10A, the projections 5, 8 can slide into and out of the recesses 6, 9, so that the conveying path followed by the modules 3 of the conveyor mat 1 can negotiate a bend in the conveying plane T formed by the top surfaces of the body parts of the modules.

In this exemplary embodiment, the conveyor mat forms an endless belt running on a sprocket wheel. Here, the modules of the mat are guided along a conveying path (not shown). Driving takes place in that the teeth of a number of the sprocket wheels engage drive surfaces provided on the modules. When travelling, the conveyor mat 1 negotiates a bend transversely to the conveying plane in that successive modules can pivot about the hinge pins 11. When travelling a straight part of the conveyor path, the tensile force in the mat is guided through, via hinge pins, over the entire width of the mat from the projections on the edge of one module to the projections on the adjoining edge of the successive module. The mat can then negotiate a bend transversely to the conveying plane as successive modules can pivot about the hinge pins.

Referring to FIG. 3, it is shown in detail that at least one of the hinge pins 11, in this case a short hinge pin 11A, bears an intermediate element 12. The intermediate element 12 is bearing mounted so as to be pivotal relative to a pivot A placed transversely to the hinge pin, in a bearing opening 13 formed in the module 3.

The intermediate element 12 is provided with a cylindrical casing surface 14 which cooperates with a correspondingly formed bearing surface 15 of the bearing opening 13 formed in the module 3.

The bearing opening 13 is located at least partly in a forward reaching hinge loop 5A. The bearing opening 13 is enclosed between two hinge holes 10A1, 10A2 of the forward reaching hinge loop 5A which are located on both sides of the bearing opening 13. The short hinge pin 11A is included, secured against rotation, in the hinge holes 10B1, 10B2 of the rearward reaching projections 8B1, 8B2 bounding the recess 9B which cooperates with the forward reaching projection in which the bearing opening 13 is formed. This can for instance be designed with the aid of serrated edges at the ends of the hinge pin 11A. Optionally, the pin 11, when this is of long design, can be fixed in a different hinge hole 10, for instance of a hinge loop which, upon negotiation of a bend in the conveying plane, is located at the inside radius of the mat.

In addition to one of the hinge holes enclosing the bearing opening, a number of further projections provided with hinge holes are provided which complete the row.

The bore forms a cylindrical abutting surface for cooperation with the cylinder surface of the hinge pin 11.

The intermediate element 12 is provided with a guide cam 20 extending downward relative to the module 3. As shown in FIG. 3, the guide cam can be provided with a bevelled guide surface 21. Alternatively, the guide cam 20 can be provided with an idler wheel 22, shown here as a conical wheel bearing mounted about a rotation axis extending substantially downward relative to the module 3.

In FIG. 1 it is shown that the successive modules 3 of the mat are interconnected by the pins 11 via intermediate elements 12 and form a chain extending in conveying direction. The bearing openings 13 and intermediate elements 12 are located adjacent a side edge 18 of the mat.

In FIG. 2, a part of a variant of the conveyor mat is shown in which several modules can be included in the mat transversely to the conveying direction. Here, the modules shown in FIG. 2 are designed as end modules.

The modules are further provided with a substantially U-shaped reinforcement bracket 23 surrounding the bearing opening. The free ends 24A, 24B of the reinforcement bracket are provided with holes for cooperation with a hinge pin 11A reaching through the holes 25A, 25B. The holes of the bracket are therefore included in a row of hinge holes 10. In this exemplary embodiment, this is the row of hinge holes 10B of the backward extending projections 8.

During assembly, the short hinge pin 11A is fitted through the holes 25 at the free ends 24 of the reinforcement bracket 23, so that during use, the hinge pin 11A and the reinforcement bracket 23 cannot rotate relative to each other. Adjacent the closed end 26 enclosing the bearing opening 13, the reinforcement bracket is provided with oversized holes 27A, 27B. These holes 27 correspond with the oversized holes 10A of the row of forward reaching projections 5 and serve for contactlessly guiding the short hinge pin 11A bearing the intermediate element. The purpose of these holes is to provide space to the hinge pin when it pivots about the pivot A via the intermediate element 2.

The projections are formed by hinge loops reaching outwards relative to a central carrier extending transversely to the conveying direction. In the row of forward reaching hinge loops, oversized hinge holes have been provided, in this exemplary embodiment designed as slotted holes oriented in conveying direction. The backward reaching hinge holes are cylindrical. The hinge holes of both the forward reaching and the backward reaching hinge loops are each in a straight line. The outermost central axes are parallel and therefore have a constant intermediate distance defining the pitch of the module.

In this exemplary embodiment, the body 17 of the module is designed from plastic and the reinforcement bracket 23 is designed from metal. Here, the intermediate element 12 is designed from plastic material, the hinge pin 11A is designed from steel, and the hinge pin 11B is designed from plastic material. It will be clear that the choice of these materials can be different and that the hinge pins 11A, 11B can also be manufactured from one whole, for instance entirely from plastic or entirely from steel.

In this exemplary embodiment, the choice is made to use the closed end of the U-shaped bracket 23 as bearing surface 15 for the intermediate element 12. It will be clear that to this end also, a plastic part of the body 17 of the module 3 can be used, for instance a plastic back surrounded by the bracket 23 or only an opening, recessed in the body 17 while no reinforcement bracket is present.

As is represented in FIG. 2, the mat 1 can be composed by, for instance, alternately interconnecting a series of short and long end modules through insertion of a short pin 11a. Then, by arranging modules 3 brick-wise, a mat 1 of desired width can be made. By including at the other edge a row of short and long customary end modules, i.e. without intermediate elements and bearing openings, the mat can be completed. Naturally, as is represented in FIG. 1, it is also possible to construct a mat comprising only one row of modules transversely to the conveying direction.

When negotiating a bend, the hinge loops and the recesses located at the inside of the bend slide into each other, to then slide out of each other after having negotiated the bend. In the embodiment shown, the modules cannot slide into each other at the location of the outside radius of the conveying mat. Depending on the driving direction of the mat, the conveying direction of the mat proceeds in a direction indicated with the double arrows 2 and the conveying mat can negotiate a bend to the left or to the right in the conveying direction. In this connection it is noted that the terms front and back as used in this application can be exchanged.

When it is desired that the mat can negotiate bends in two directions in the conveying plane in a conveying direction, the chain of intermediate elements can be provided in the center of the mat, for instance by providing a special center module. Such a module can for instance be made by designing the modules represented so as to be double, through mirroring about the pivot of the bearing opening and having the pitch between the hinge holes increase from the intermediate element when the modules travel transversely to the conveying direction.

It is noted that the invention is not limited to the embodiments described here, but that many variants are possible within the range of the invention as outlined by the following claims.

What is claimed is:

1. A conveyor mat, comprising a number of plastic modules successive in conveying direction which are each provided at a front and rear side with a row of projections extending transversely to the conveying direction, provided with hinge holes with recesses located therebetween, the projections cooperating with recesses of adjoining modules, while hinge loops of successive modules are coupled with the aid of hinge pins reaching through the hinge holes, transversely to the transport direction, the hinge pins being included with clearance in oversized hinge holes of projections at the front and/or the rear side, wherein at least two successive modules are interconnected via an intermediate element which is borne on a hinge pin and which is bearing mounted so as to be pivotal substantially transversely to the hinge pin in a bearing opening formed in one of the modules.

2. A conveyor mat according to claim 1, wherein the intermediate element is provided with a casing surface which is at least partly cylindrical or conical for cooperation with a corresponding surface of the bearing opening.

3. A conveyor mat according to claim 1, wherein the intermediate element is provided with a bore extending transversely to the pivot of the intermediate element for including the hinge pin.

4. A conveyor mat according to claim 3, wherein the bore is provided with an abutting surface of at least partly cylindrical or conical form for cooperation with the surface of the hinge pin.

5. A conveyor mat according to claim 1, wherein the intermediate element is provided with a guide cam extending downwards at an underside of the module.

6. A conveyor mat according to claim 5, wherein the guide cam is provided with an idler wheel.

7. A conveyor mat according to claim 1, wherein modules which are interconnected via intermediate elements form a chain extending in conveying direction.

8. A conveyor mat according to claim 1, wherein the bearing openings and intermediate elements are located adjacent a side edge of the mat.

9. A conveyor mat according to claim 1, wherein transversely to the conveying direction, several modules have been included in the mat and wherein the bearing openings with the intermediate elements have been provided in end modules provided at the longitudinal edge of the mat.

10. A conveyor mat according to claim 1, wherein further, a substantially U shaped reinforcement bracket is provided surrounding the bearing opening and whose free ends are provided with holes for cooperation with a hinge pin reaching through the holes.

11. A conveyor mat according to claim 10, wherein adjacent the closed end surrounding the bearing opening, the bracket is provided with oversized holes for contactlessly guiding a further hinge pin.

12. A conveyor mat according to claim 1, wherein at least a number of the projections are formed by hinge loops reaching outwards relative to a central carrier of a module.

13. A conveyor mat according to claim 1, wherein the distance between the outermost central axes of the hinge loops is constant.

14. A conveyor mat according to claim 1, wherein at least one of the modules is provided with a central carrier, a part of which, located, during use closer to the center in conveying direction, is narrower than a part located during use closer to the side edge so that in conveying direction, the recesses between the hinge loops are deeper in the first part than in the second part.

15. A conveyor mat according to claim 14, wherein the modules is provided with further hinge holes for including at least one further hinge pin.

16. A conveyor mat according to claim 1, wherein at least one of the modules provided with a bearing opening is provided with at least one projection with two hinge holes which enclose the bearing opening.

17. A conveyor mat according to claim 1, wherein, during use, at least one of the modules is provided with a hinge pin secured against rotation, preferably a hinge pin fixed in hinge holes located on both sides of a bearing opening.

18. A module for a modular conveyor mat, comprising a body element provided at the front and the rear side with a row of projections provided with hinge holes, with recesses located therebetween, wherein the module is provided with a bearing opening for bearing mounting of an intermediate element so as to be pivotal relative to a pivot extending substantially transversely to a central axis through one of the rows of hinge holes, wherein in the bearing opening, the intermediate element is included.

19. A module according to claim 18, wherein the bearing opening is enclosed between two hinge holes.

20. A conveyor mat according to claim 19, wherein in addition to at least one of the hinge holes enclosing the bearing opening, on the other side of the bearing opening, a number of further projections with hinge holes is formed.

21. A module according to claim 18, wherein the module is further provided with a substantially U-shaped reinforcement bracket surrounding the bearing opening and whose free ends are provided with holes located in the row of hinge holes at the front or rear side of the module.

22. A module according to claim 18, wherein the distance between the outermost central axes of the row of hinge holes is substantially constant and wherein at least a number of the projections is formed by hinge loops reaching forward and backward, respectively, relative to the central carrier, while a part located, during use, closer to the center of the conveyor mat of the central carrier is narrow in conveying direction than a part located during use closer to the side edge of the central carrier so that the recesses between the hinge loops at the first part are deeper in conveying direction than at the second part.

* * * * *